US006734848B2

United States Patent
Bires

(10) Patent No.: US 6,734,848 B2
(45) Date of Patent: May 11, 2004

(54) ANIMATED 3D VISUALIZATION OF SUPER MULTIVARIATE EQUATIONS

(75) Inventor: Thomas L. Bires, Mill Valley, CA (US)

(73) Assignee: Business Animation Inc., Mill Valley, CA (US)

( * ) Notice: Subject to any disclaimer, the term of this patent is extended or adjusted under 35 U.S.C. 154(b) by 403 days.

(21) Appl. No.: 09/949,433

(22) Filed: Sep. 7, 2001

(65) Prior Publication Data

US 2003/0048273 A1 Mar. 13, 2003

(51) Int. Cl.⁷ .............................................. G06T 15/00
(52) U.S. Cl. ........................ 345/419; 345/440; 345/441
(58) Field of Search ................................ 345/440, 441, 345/419, 420, 581, 585

(56) References Cited

U.S. PATENT DOCUMENTS

| | | | |
|---|---|---|---|
| 5,426,729 A | 6/1995 | Parker | 345/441 |
| 5,622,823 A | 4/1997 | Perlin | 435/6 |
| 6,650,339 B1 * | 11/2003 | Silva et al. | 345/619 |

OTHER PUBLICATIONS

Ying–Huey Fua, Matthew O. Ward, Elke A. Rundensteiner, *Hierarchical Parallel Coordinates for Exploration of Large Datasets* (1999).
Stephen G. Eick, *Advizor™ : A Technical Overview* (1999).
Bill Hibbard, Johan Kellum, *Vis5D Home Page* (1998).
Lisa Tweedie, *Characterizing Interactive Externalizations* (1997).
Penny Rheingans, *Dynamic Color Mapping of Bivariate Qualitative Data* (1997).
Phillip A. Mlsna, et al, *NOVA—An Interactive Network Design Visualization and Optimization Tool* (1996).
Ed Huai–hsin Chi, et al, *Flexible Information Visualization of Multivariate Data from Biological Sequence Similarity Searches* (1996).
Lisa Tweedie, et al, *Externalising Abstract Mathematical Models* (1996).
George G. Robertson, et al, *Information Visualization Using 3D Interactive Animation* (1993).

* cited by examiner

Primary Examiner—Matthew Luu
(74) Attorney, Agent, or Firm—Robert Moll

(57) ABSTRACT

A method and system are provided for performing animated 3D visualization of super multivariate equations. Rendered 3D surfaces representing super multivariate equations are animated by user modification of higher order variables to the equations. The higher order independent variables are independent variables, which are not represented in the X-axis (horizontal) or the Z-axis (depth into the screen) of the rendered 3D surfaces. The rendered 3D surfaces represent the equation's dependent variable displayed in the Y-axis (vertical) plotted against two of the independent variables (rendered variables) of the equation displayed in the X-axis and the Z-axis. Animation of a surface is in response to modification of higher order independent variables (those variables not rendered in the X-axis and the Z-axis. Modification is accomplished using user interface elements, which modify values of the higher order variables of the super multivariate equation. Modified higher order variables are used to calculate new surface coordinates, which are then rendered to the display device replacing the previous surface and creating the effect of interactive animation. User interface elements are also provided to adjust the position of visible, movable markers on the surfaces. Digital read-outs display the value of the dependent variable and selected independent variables at marked points on the surfaces

20 Claims, 6 Drawing Sheets

ANIMATED 3D VISUALIZATION OF SUPER MULTIVARIATE EQUATIONS

The invention relates to the field of computer visualization of multivariate equations.

BACKGROUND

For centuries scientists and other mathematicians have described the complexity of our universe using the language of mathematics. Multivariate equations are particularly useful in describing a number of phenomena and relationships in the world, and are simply equations having a dependent variable whose outcome is functionally determined by two or more independent variables.

It is not too difficult to visualize and thus understand a multivariate equation having only two independent variables because we can plot the equation's dependent variable on the Y-axis (vertical) and its independent variables on the X-axis (horizontal) and Z-axis (depth) to produce a 3D rendering of the equation representing all variables. It is more difficult to visualize and understand the behavior of super multivariate equations, those having three or more independent variables, because they require representations of objects having more than three dimensions. Thus, the technique described earlier has limited value for representing super multivariate equations because only two axes are available for plotting the independent variables, and the equation's behavior relative to higher order independent variables cannot be readily displayed.

Yet there is a tremendous need in various fields to better understand the behavior of super multivariate equations. For example, in metrology the propagation of weather patterns is modeled with super multivariate equations. Many biological functions such as blood pressure are non-linearly dependent on multiple factors such as temperature, age, time of day, and chemical concentrations in the blood. All non-trivial sociological models of group behavior are dependent on more than two variables such as gross population, population density, age, and education. The behavior of most chemical reactions is dependent on more than two variables such as temperature, pressure, and chemical concentration. Many physical phenomena are non-linear and contain more than two independent variables. For example, the strength of a magnetic field at the center of a solenoid is non-linearly dependent on the number of turns in the solenoid, its diameter, and the amperage applied to the wire. From subatomic particle interactions to galactic formation, understanding the physical behavior of our universe requires an understanding of super multivariate equations.

Business relationships can also be modeled by super multivariate equations. Many econometric models are non-linear super multivariate equations dependent on variables such as inflation, GDP growth, productivity growth, population growth, consumer spending, unemployment rate, and time of year. The output of many important manufacturing and chemical refining processes are described by super multivariate equations. Efficient manufacturing and refining management requires managers to understand the relative costs, benefits, and risks of alternate production strategies. The value of most derivative financial instruments and investments is non-linearly dependent on more than two variables. The Black-Scholes option pricing equations, arbitrage free binomial and trinomial fixed income pricing models, and discounted cash flow investment models are all described by super multivariate equations.

As an example, an employee may receive stock options as part of her compensation. Typically, over time, the employee may acquire options with different strike prices and expiration dates and having a graduated vesting structure. The after tax value of this option portfolio can be modeled as a super multivariate equation with a number of independent variables including the stock price, stock price volatility, stock dividend rate, risk free interest rates, time to expiration, percentage vested, and federal and state income tax rates, which may vary relative to holding periods and income levels. The portfolio's after-tax value can be calculated as the dependent variable of a complex non-linear super multivariate equation based on the independent variables listed above. Given the complexity, not many people can quickly understand their financial position relative to a portfolio of this nature or can best evaluate actions to maximize their after tax return. This and many other problems described by super multivariate equations could be better understood if there were better ways to represent super multivariate equations so that people could rapidly visualize the effect of changes in all of the independent variables. There is a need for more effective ways of visualizing the behavior of super multivariate equations.

SUMMARY OF THE INVENTION

The invention provides a method and system for representing multivariate equations. In one embodiment, a computer displays one or more rendered three-dimensional (3D) surfaces, which represent super multivariate equations. The surfaces are rendered on 3D Cartesian coordinates to represent the value of the equation's dependent variable plotted over ranges for two of the equation's independent variables (the rendered independent variables). The user can access user interface elements to modify and manipulate the values for the equation's higher order independent variables (those which are not displayed in the Cartesian coordinates). Upon modification of these higher order independent variables, the system calculates and renders a new, corresponding 3D representation of the equation using the modified higher order independent variable values. The animated interaction of modifying the higher order independent variables by the user interface elements while observing the new representation can increase the user's understanding of the behavior of the super multivariate equation relative to the higher order independent variable(s) being modified.

The invention takes a large step toward demystifying the behavior of super multivariate equations in a way that was not previously accomplished. The ability to understand complexity is a prerequisite for technological advancement. Tools, such as the present method and system, will enhance our understanding of complexity. The value of an intuitive tool can be significant because it permits a larger population to gain an improved understanding of the behavior of super multivariate equations in many fields.

DETAILED DESCRIPTION OF THE INVENTION

Figure 1:
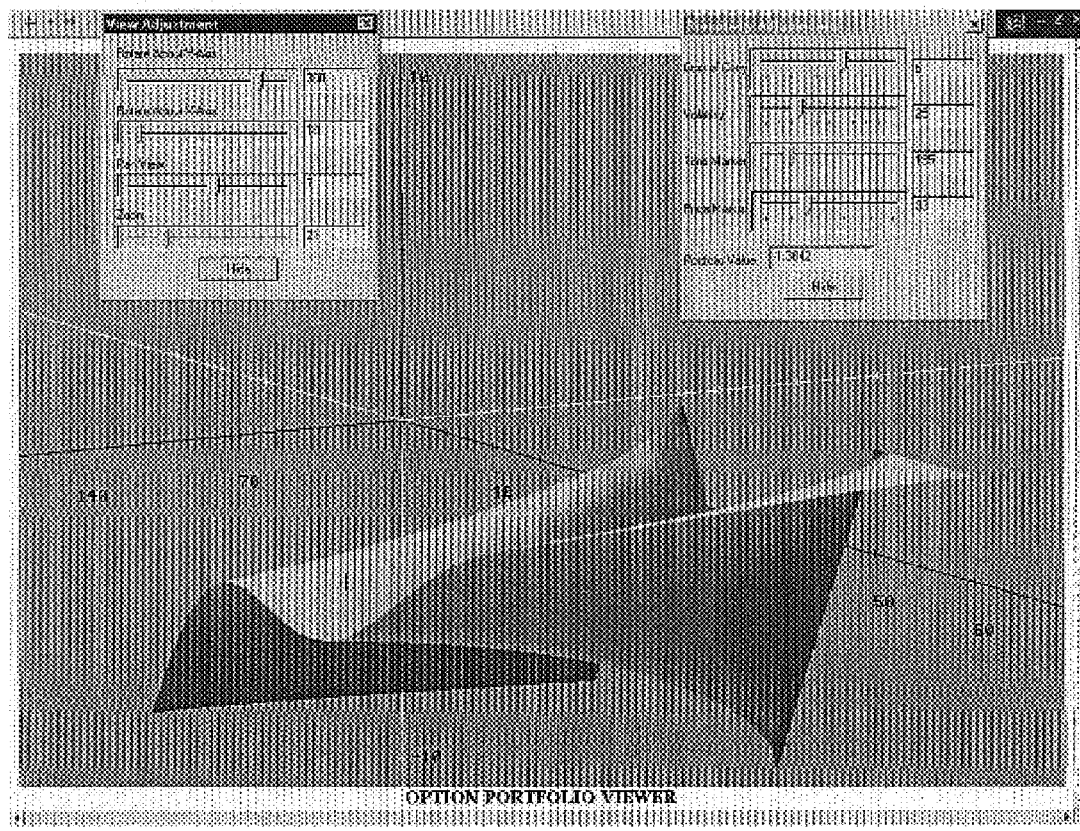
FIG. 1 is a screen shot of a rendered surface with user interface elements presented in dialog boxes.

Before turning to the details of the invention, it may help to provide a summary of certain terminology and definitions.

A super multivariate equation is a mathematical equation where a dependent variable Y is functionally determined by a set of at least three independent variables. In general, a super multivariate equation is of the form $$Y=f(x_1,x_2,x_3,\ldots,x_n),$$

Where:

Y is the dependent variable of the equation $f$ is a mathematical function $x_1$ to $x_n$ are the independent variables to the equation.

We calculate the dependent variable Y by substituting values for the independent variables $x_1$ to $x_n$ and applying the function $f$ to the values.

To render a multivariate equation is to generate a two-dimensional image of a three dimensional surface representing the equation. This is accomplished by plotting the calculated dependent variable of the equation along one axis (e.g., the vertical Y-axis) and plotting two of the equation's independent variables (the rendered variables) in the two remaining orthogonal axes of a 3D Cartesian coordinate system (e.g., the horizontal X-axis and the Z-axis representing depth). The calculated 3D surface can be projected from three dimensions into two-dimensions for viewing on a computer display device. This projection may be accomplished using a variety of projection techniques such as perspective projection or orthogonal projection.

A higher order independent variable is an independent variable, to a super multivariate equation, which is not displayed on the X-axis or the Z-axis in a 3D visualization of the equation. For example, a rendered 3D surface to visualize an equation of the form in the definition above would display the dependent variable, Y on the Y-axis (vertical). Two of the independent variables (e.g., $x_1$ and $x_2$) would be displayed on the X-axis (horizontal) and the Z-axis (depth) respectively. The remaining independent variables ($x_3$ to $x_n$ in this example) would be termed higher order independent variables.

A user interface element is a computer graphic and/or text-based control, which allows user interaction by a keyboard or a pointing device to modify and manipulate a value displayed in the element and/or to change the appearance of the element. A user interface element can be associated with one or more values in a computer program, which are modified as the element is modified.

A translucent surface is one whose shape can be seen, but also allows the user to see objects and shapes behind the surface. As an example, a lightly tinted piece of glass is clearly discernable and it also permits one to see objects behind the glass surface.

The invention is a method and system to provide animated 3D visualization of super multivariate equations. Animation is the production of apparent movement or transformation of the shape of an object by displaying successive, altered images of the object. In the case of animated 3D visualization, the user can generate the apparent transformation of the shape of a surface, which is a visualization of a super multivariate equation, by modifying the values of the independent variables. This apparent motion and transformation is shown on a computer display by rendering successive altered surfaces where each surface is a static visualization of the equation for a different set of variable values.

Figure 2:
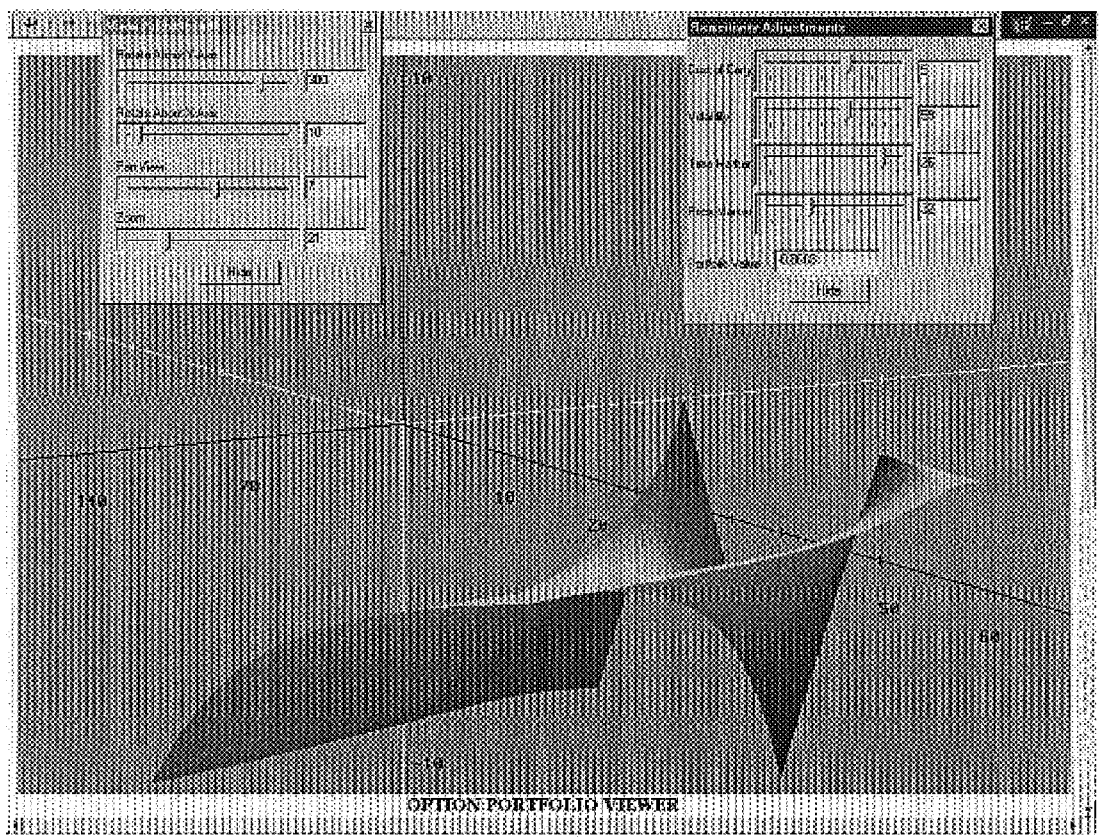
FIG. 2 is a screen shot of the rendered surface after a higher order variable has been modified and after markers on the surface have been moved.

In one embodiment, the invention renders the super multivariate equations as projected 3D surfaces built from mosaics of polygons with common edges. In this embodiment, the polygon vertices are 3D coordinates (X, Y, Z) with the equation's dependent variable displayed on the Y-axis (vertical) and two of the equation's independent variables displayed on the X-axis (horizontal) and Z-axis (depth). To animate a rendered surface one or more user interface elements (e.g., sliders, spinners, digital read-outs, or other user interface elements controlled by a keyboard or a pointing device such as a mouse, track ball, finger pad, finger nub, or joy stick) can be used to allow the user to modify one or more of the higher order independent variables to the super multivariate equations. When the value of one or more higher order variables is modified using the user interface elements, the modified value(s) are used to calculate and render a new surface. The new surface is then displayed in place of the previous surface providing a succession of surfaces as the higher order independent variable value(s) are modified. This provides the effect of interactive animation of the viewed surface as shown in FIGS. 1 and 2.

The super multivariate equations displayed may be also rendered as translucent surfaces allowing users to simultaneously visualize the multiple surfaces by seeing through the top surface(s) to visualize other surface(s) representing other super multivariate equations drawn on the same axes. The surfaces may be animated individually or simultaneously in the case where a higher order independent variable is common to two or more of the super multivariate equations displayed.

One or more user interface elements and one or more digital read-outs can be used to allow the user to control the position (X and Y coordinates) of one or more markers which are drawn on one or more surfaces. This allows the user to see and move the marker(s) to desired point(s) on the surface(s) and then read the value of the dependent variable (s) at the selected point(s) on the surface(s) as shown in FIGS. 1 and 2.

Figure 3:
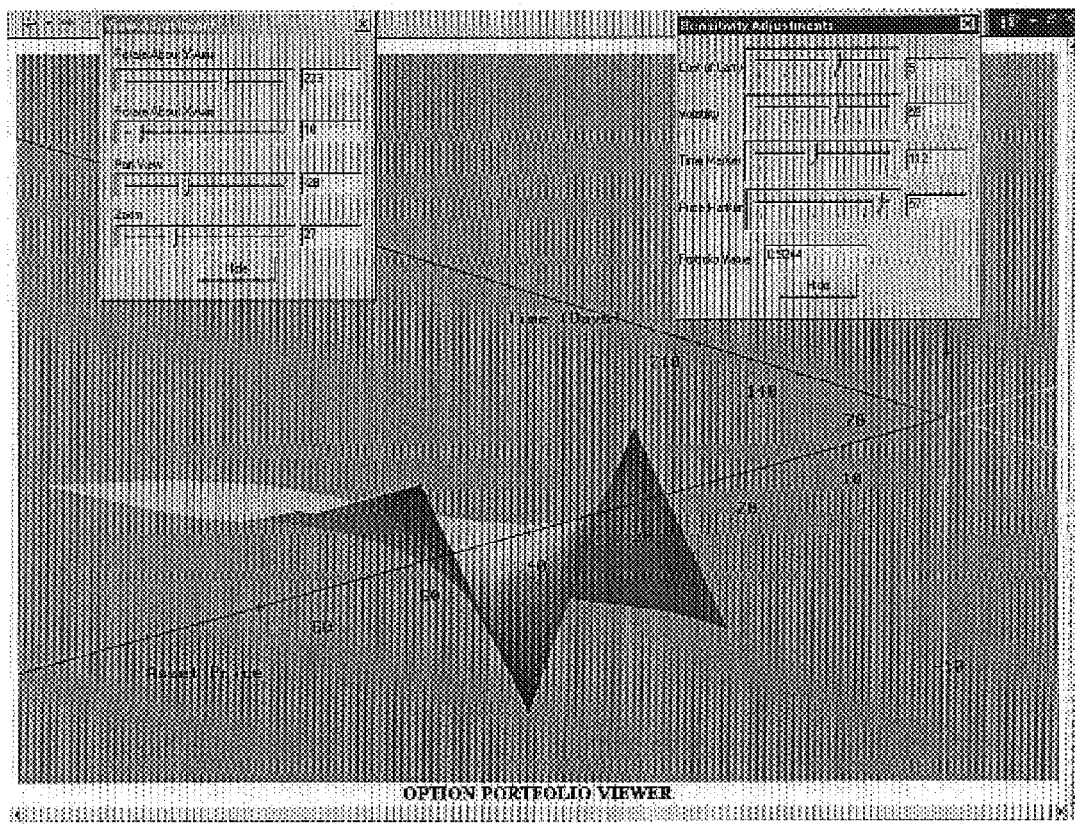
FIG. 3 is a screen shot of the rendered surface after the viewing parameters have been modified.

One or more user interface elements permit the user(s) to control the orientation, size, and position of the viewed surface(s) as shown in FIG. 3.

In one embodiment, the source code contained in Appendix A is compiled and linked to create an ActiveX control. The control can be loaded and executed in the Microsoft Internet Explorer Web browser. ActiveX controls can be installed and executed over the Internet using HTML version 4.0 and higher. The ActiveX control created from the code in Appendix A can be executed on an IBM compatible personal computer (PC) running the Microsoft Windows (95 or higher) operating system. However, one of ordinary skill could modify the code (after review of the specification) to run as a stand alone application, a clientiserver application, or as another type of component such as a Java applet. Any of these modifications may run on other hardware and operating systems such as the Apple OS's, Sun Solaris, HP Unix, IBM AIX, Linux, Palm, and others. In order to compile and execute the source code of Appendix A the computer should meet the following hardware and software requirements:

Intel Pentium or compatible processor.

2 Mb free space on the hard disk or similar storage device

Keyboard

Pointing device.

Microsoft Windows operating system (version 95, 98, ME, XP, NT, 2000 or higher).

Microsoft Internet Explorer Web browser (version 5.0 or higher).

Microsoft Visual C++ Enterprise Edition (Version 6.0) will compile and link the attached source code, but is not required to run the program.

The present embodiment of the invention has been programmed to execute the method and system of animated 3D visualization on a pair of super multivariate equations. The super multivariate equations chosen are the Black-Scholes equations for calculating the value of financial options. The equations for European call (c) and put (p) options are as follows:

$$c(S,T;X) = Se^{(b-r)T} N(d_1) - Xe^{-rT} N(d2),$$

and $$p(S,T;X) = Xe^{-rT} N(-d_2) - Se^{(b-r)T} N(-d_1),$$

Where $$d_1 = \frac{\ln(S/X) + (b + .5\text{sigma}^2)T}{\text{sigma}\sqrt{T}},$$

$$d_2 = d_1 - \text{sigma}\sqrt{\sqrt{T}}$$

$$N(d) = \int_{-\infty}^{d} \frac{1}{\sqrt{2\pi}} e^{-z^2/2} dz = \text{Prob}(\tilde{z} < d)$$

z=random variable of the cumulative normal probability distribution

S=underlying asset price

X=option exercise price b=underlying asset cost of carry r=risk free interest rate sigma=volatility of the underlying asset price T=time to option expiration The source code of Appendix A can be used to visualize the Black-Scholes equations, but the invention is clearly not limited to this particular set of equations. The invention can be also used to visualize many other super multivariate equations simply by adapting the code of Appendix A to use the desired super multivariate equation(s). Moreover, as illustrated in the background, there are many different fields of science and business where one can find super multivariate equations suitable for visualization by the invention.

Figure 4:
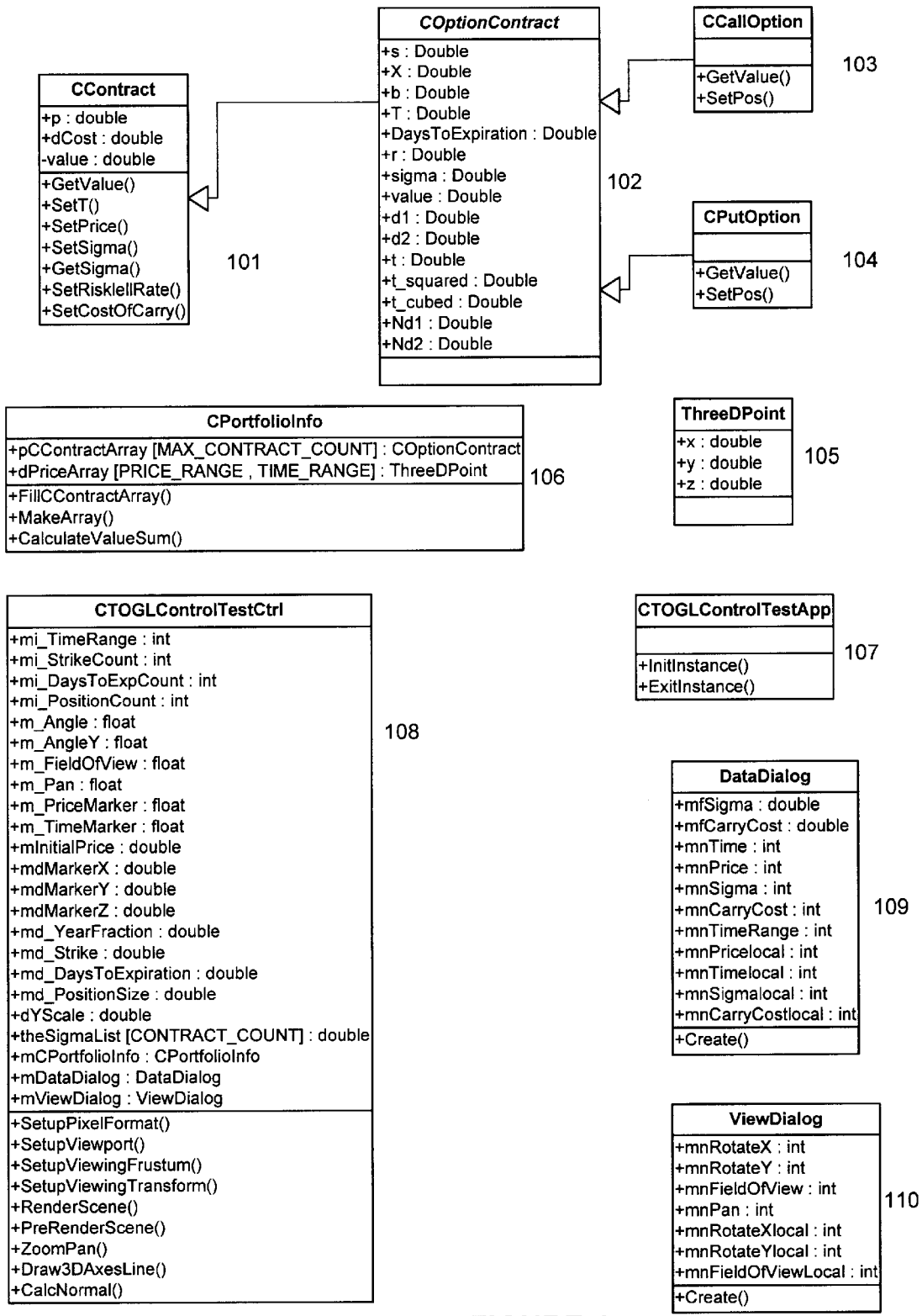
FIG. 4 shows a static description, in standard UML notation of the major classes in one embodiment of the invention.

FIG. 4 illustrates a static description of the classes of one embodiment in standard UML notation as described in Fowler and Scott, *UML Distilled: A Brief Guide to the Standard Object Modeling Language* (2000) Addison-Wesley, which is hereby incorporated by reference. A class is a prototype for an object in an object-oriented language such as C++, Java, or Smalltalk. See, Eckel, *Thinking in C++* and Eckel, *Thinking in Java* (2000) for details about two object-oriented languages, which are hereby incorporated by reference. As shown in FIG. 4, the classes contain variables (listed immediately below the class name) as well as functions (listed below the variables). The class descriptions in FIG. 4 are abbreviated for clarity, and the complete class descriptions are given in the source code of Appendix A.

As shown in FIG. 4, the CportfolioInfo 106 class contains the data and functions for the financial option portfolio to be rendered. The functions contained in CportfolioInfo 106 construct an array of ThreeDPoints 105 (X, Y, Z values). An array is a collection of identically typed data items distinguished by their indices. In the case of CportfolioInfo the data items are numbers indicating the locations of points, which represent the value of the option portfolio (Y-axis) over ranges of underlying asset price (X-axis) and time to expiration (Z-axis). The Ccontract 101, COptionContract 102, CCallOption 103, and CPutOption 104 classes form a class hierarchy, which contains the data and functions to represent a financial option contract and to calculate its value from the contained data. The functions in this hierarchy calculate the option values using the Black-Scholes option pricing equations. One skilled in the art can use alternate pricing models to calculate option values based on the type of underlying asset and its behavior.

The CTOGLControlTestCtrl 108, ViewDialog 110, and DataDialog 109 classes contain data and functions to collaboratively render the animated 3D surface using the standard Microsoft Foundation Class (MFC)/Windows event model and the OpenGL graphics library, which is included with Microsoft Windows operating systems released since 1996.

Figure 5:
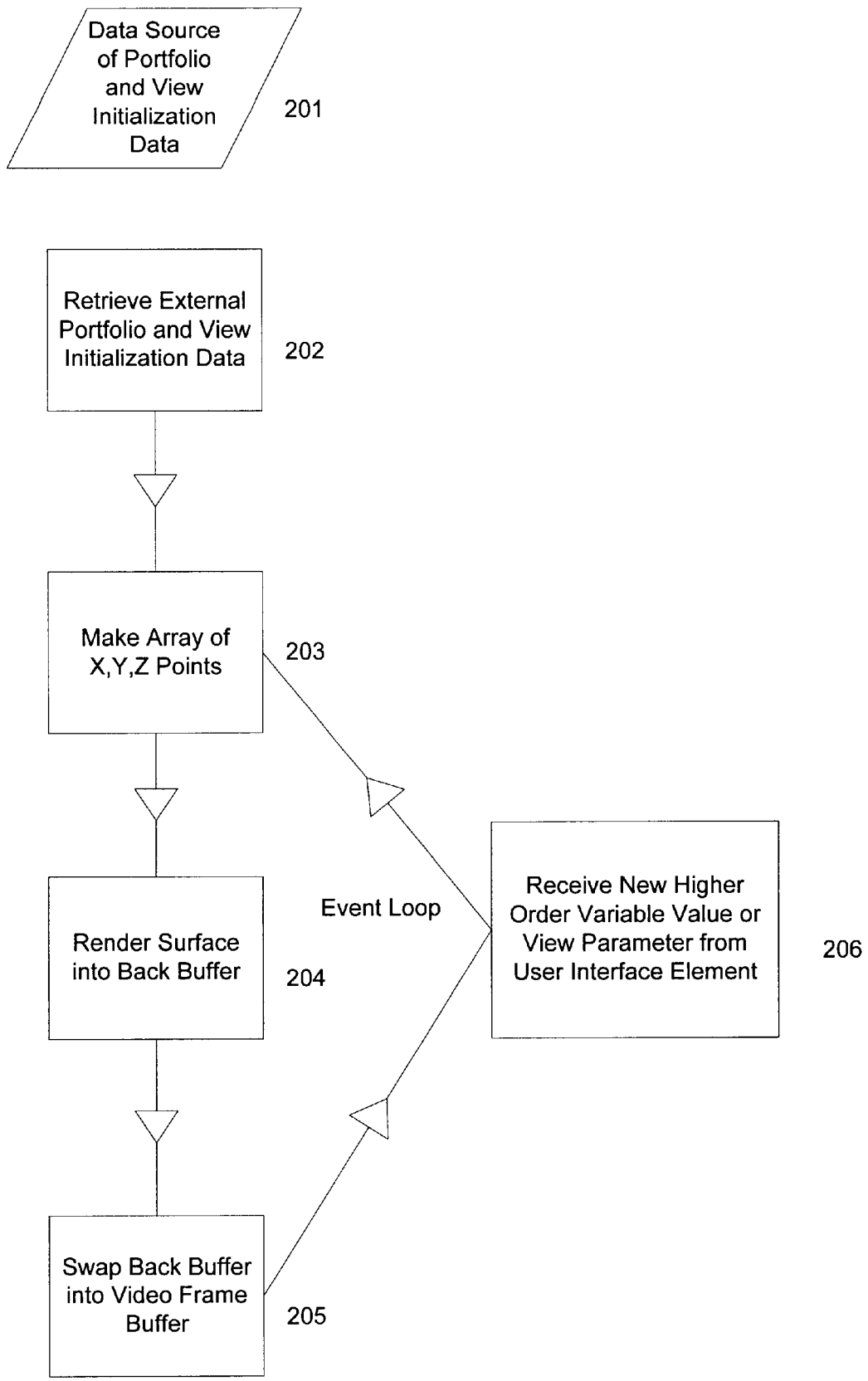
FIG. 5 is a flow chart describing the high level steps in one embodiment of the invention, which allows the user to visualize and animate 3D renderings of super multivariate equations.

FIG. 5 is a flow chart describing the high level steps in a method, which allows the user to visualize and animate a 3D rendering of a super multivariate equation. The "Data Source of Portfolio and View Initialization Data" 201 step in this embodiment is an HTML form, which retrieves the following data: View Parameters (Time Range, Time Units, Y Scale) and Option Parameters (Strike Price, Days from Expiration to End of Time Range, Position Size, Position Cost).

"Retrieve External Portfolio and View Initialization Data" 202 is accomplished by an instance of the CTOGLControlTestCtrl 108 class. This data is fed to an instance of the CportfolioInfo 106 class to be processed as described above. One of ordinary skill can also implement the invention to use an alternate data interface such as a class structure to access local or remote databases. The specific selection of a data interface is not critical to this invention, only that the system contains a method to initialize data. The current embodiment initializes all higher order variables with preset values in the software. One of ordinary skill may vary the method of higher order variable initialization without altering the unique benefit of animated 3D visualization of super multivariate equations.

The "Make Array of X, Y, Z Points" 203 step is a function of the CportfolioInfo 106 class. This function uses portfolio data, view parameters, and higher order variable values to create a two dimensional array of 3D points across a range of underlying asset prices and times to expiration. This array contains the X, Y, Z values which will be used to render the 3D surface representing the super multivariate equation. The CportfolioInfo 106 class calls functions in the CCallOption 103 and CPutOption 104 classes to based upon perform pricing calculations underlying asset prices, time to expiration, risk free interest rate, cost of carry, and projected asset volatility for the period to expiration using the Black Scholes equations.

The "Render Surface into Back Buffer" 204 step represents a set of functions controlled by the CTOGLControlTestCtrl 108 class. These functions build a surface as a mosaic of triangles using the values calculated in step 203. These values have been stored in the two dimensional array of 3D points described above. These values are used to create triangles. The triangle's vertexes are fed to functions to determine each triangle's surface normal. The surface normal is a vector perpendicular to the surface of the triangle. This vector is used for surface reflection calculations. Front and back surface properties are set. Virtual lighting values are set. Each triangle and its normal are then fed into the graphics library functions (in this embodiment OpenGL is used), which render the triangle into a temporary memory area known as the back buffer.

After the entire surface has been built in the back buffer, the back buffer is "swapped" into the video frame buffer of the computer in the "Swap Back Buffer into Video Frame Buffer," step 205. This is when the surface becomes visible on the user's display device.

Step 205 completes the rendering of an individual surface. Animation of the surface is accomplished with the assistance of an event loop. The Microsoft Windows event loop is a process in the Windows operating system, which reacts when users create recognizable events using a pointing device, keyboard or other input device. The present system is programmed to recognize a set of events associated with user interface elements. The user manipulates the user interface elements to modify higher order variable values and view parameters. The "Receive New Higher Order Variable Value or View Parameter from User Interface Element" 206 step represents this user interaction. When a user manipulates a user interface element associated with a particular higher order variable or view parameter, that variable or parameter's modified value is captured by the system in the ViewDialog 110 or DataDialog 109 classes. The modified value is then passed to the CTOGLControlTestCtrl 108 class. The new value is then made available to the "Make Array of X, Y, Z Points" 203 step which recalculates the two dimensional array of 3D points. The new array is fed to the "Render Surface into Back Buffer" 204 step where the triangles are created and saved in the back buffer. Then the "Swap Back Buffer into Video Frame Buffer" 205 step moves the new image in the back buffer into the video frame buffer of the computer making the new surface visible. Repeated execution of this loop results in animation of the rendered surface as the user interface elements are manipulated to modify a higher order variable or view parameter.

Figure 6:
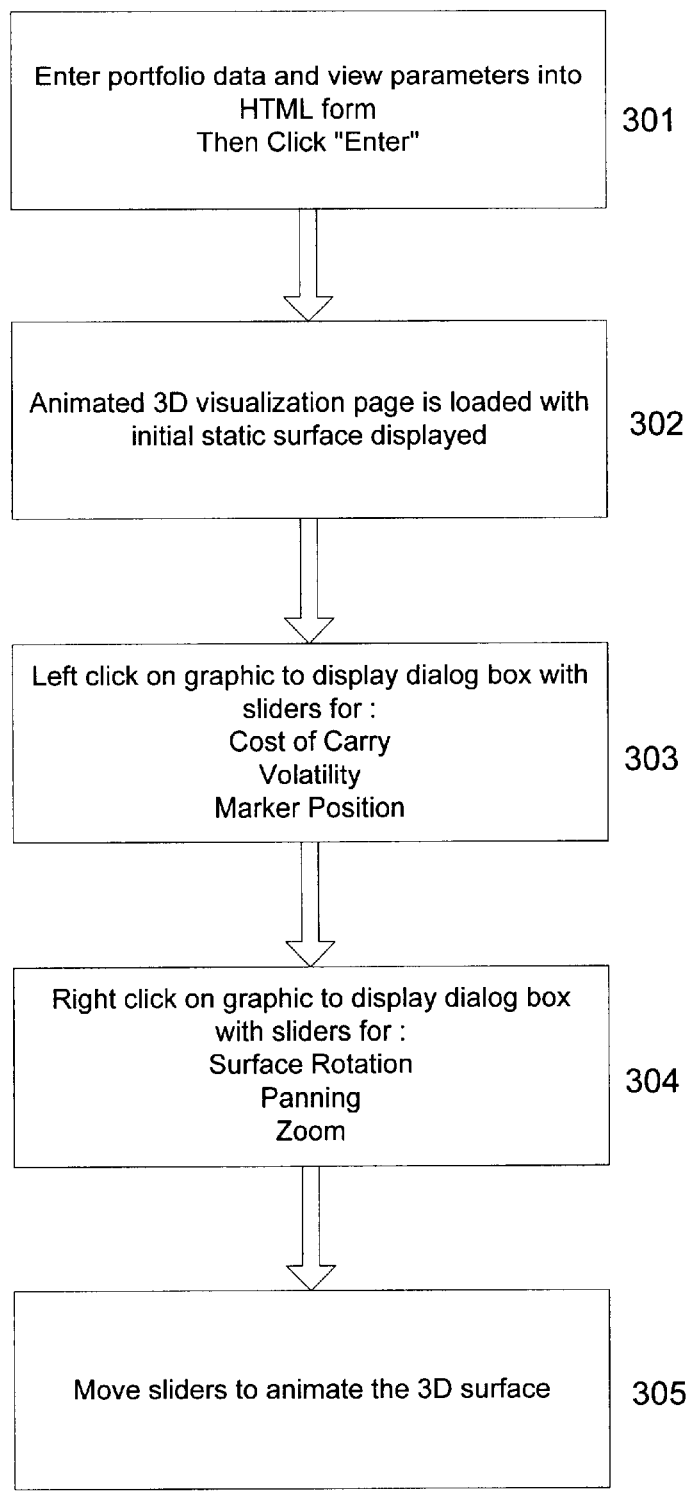
FIG. 6 is a flow chart describing the user's interaction with the system to perform animated 3D visualization of multivariate equations.

FIG. 6 describes how a user may operate one embodiment of the program. To start this embodiment the user navigates his or her Microsoft Internet Explorer browser to the portfolio and view parameter entry form page step 301. This is an HTML form, which contains default portfolio and view parameters, which may be modified by the user with drop-down box elements.

When a user clicks the "Enter" button on the initialization form, the animated 3D visualization page is loaded into the browser at step 302. This page is an HTML page, which uses a standard HTML <Object> tag to load the animated 3D visualization program onto the user's computer. The program is in the form of an ActiveX control component with a graphical user interface. The graphical user interface displays a rendered static 3D surface representing the value of a portfolio of financial options over ranges of underlying asset price and time to expiration. Labeled Cartesian coordinate axes are also displayed.

After the graphical user interface is displayed the user may left-click with a pointing device, positioned over the graphic portion of the page, to display a dialog box at step 303 containing the user interface elements for manipulating cost of carry, volatility, and marker position values.

The user may also right-click with a pointing device, positioned over the graphic portion of the page, to display a dialog box at step 304 containing user interface elements for manipulation of view parameters including rotation, pan, and zoom. The use of dialog boxes initiated by mouse clicks is one of many techniques by which one of ordinary skill may present interface elements to the user.

When a dialog box is visible a user may manipulate the user interface elements to animate the surface at step 305. The effect of animation is created as the program retrieves modified values from the user interface elements, calculates the values for a new surface, and renders the new surface.

Accordingly, several objects and advantages of the invention are, the user can control animation of 3D renderings of super multivariate equations by use of user interface elements, which manipulate higher order independent variable(s) to the super multivariate equations. This interactive manipulation of higher order variables and animated 3D visualization of the described surface can enhance the user's understanding of the behavior of super multivariate equation(s) and their sensitivity relative to the higher order independent variable(s). The user can also control the position of visible marker(s) on the displayed surface(s) by use of user interface element(s) and read the value of the dependent variable(s) at the selected point(s). The dependent variable as well as selected independent variable values are displayed and updated in digital read-outs as the marker is moved. The dependent variable as well as selected higher order independent variables are also displayed and updated as higher order independent variables are modified with user interface elements.

The invention can be also implemented to allow one or more users to simultaneously modify multiple independent variables to interactively animate the rendered surface, e.g., with a joystick or a combination of keyboard and pointing device manipulations. The invention can display and animate multiple translucent surfaces simultaneously representing two or more super multivariate equations. Further, the invention can display animated 3D visualizations of multivariate equations using a display device, which creates 3D holographs. These holographs will not requiring the projection of the surface from three to two dimensions as is required for display on a standard computer display device.

What is claimed:

1. A computer-implemented method for performing animated 3D visualization of a super multivariate equation, comprising:

accepting user supplied or preset or computer generated initial ranges for the rendered variables of the super multivariate equation;

accepting a user supplied or preset or computer generated initial value and range for at least one higher order independent variable of the super multivariate equation;

rendering a surface representing the dependent variable of the super multivariate equation over the initial ranges for the rendered independent variables and using the initialized higher order independent variable(s) value(s);

accepting a modified value for a higher order independent variable to the super multivariate equation via a user interface element;

replacing the rendered surface with a newly rendered surface representing the super multivariate equation calculated over the initial ranges for the rendered independent variables and using the modified higher order independent variable value; and repeating the acceptance of user modified values and the replacing of the rendered surface to produce interactive animation of the surface representing the super multivariate equation.

2. The method of claim 1, further comprising the display and animation of multiple surfaces representing multiple super multivariate equations.

3. The method of claim 1, wherein the rendered surface is rendered using perspective projection.

4. The method of claim 1, wherein the rendered surface is rendered using orthogonal projection.

5. The method of claim 1, wherein the rendered surface is rendered with labeled X, Y, and Z-axes.

6. The method of claim 1, wherein the rendered surface is rendered with smooth shading using illumination by positioned virtual lights with ambient, diffuse, and specular properties.

7. The method of claim 1, wherein the rendered surface is rendered with hidden surface removal.

8. The method of claim 1, wherein the rendered surface is rendered with different colors for front and back sides of the surface.

9. The method of claim 1, wherein the rendered surface is rendered with a texture mapped on one or more sides of the surface.

10. The method of claim 1, further comprising user interface elements which allow the user to interactively zoom, pan, and rotate the rendered surface.

11. The method of claim 1, further comprising user interface elements which allow the user to interactively modify the initial ranges of the rendered variables of the super multivariate equation.

12. The method of claim 1, further comprising one or more visible markers which may be interactively moved to selected positions on the rendered surface using user interface elements, and the value of the dependent variable of the super multivariate equation at the selected positions is displayed.

13. The method of claim 1, wherein the super multivariate equation calculates the value of a portfolio of financial derivatives.

14. The method of claim 1, wherein the super multivariate equation calculates the internal rate of return of an investment portfolio.

15. The method of claim 2, further comprising one or more markers which may be interactively moved to selected positions on the rendered surfaces using user interface elements, and the values of the dependent variables of the super multivariate equations at the selected positions are displayed.

16. An article of manufacture comprising:
    a computer usable medium having computer readable program code means embodied therein for causing a 3D visualization of a super multivariate equation to be animated via user interaction, the computer readable program code means in said article of manufacture comprising:
    computer readable program code means for causing a computer to effect accepting user supplied or preset or computer generated initial ranges for the rendered variables of the super multivariate equation;
    computer readable program code means for causing a computer to effect accepting a user supplied or preset or computer generated initial value and range for at least one higher order independent variable of the super multivariate equation;
    computer readable program code means for causing a computer to effect rendering a surface representing the dependent variable of the super multivariate equation over the ranges for the rendered independent variables and using the initialized higher order independent variable(s) value(s);
    computer readable program code means for causing a computer to effect accepting a user modified value for a higher order independent variable to the super multivariate equation via a user interface element;
    computer readable program code means for causing a computer to effect replacing the rendered surface with a newly rendered surface representing the dependent variable of the super multivariate equation calculated over the initial ranges for the rendered independent variables and using the user modified higher order independent variable value;
    computer readable program code means for causing a computer to effect repeating the acceptance of user modified values and the replacing of the rendered surface to produce interactive animation of the surface representing the super multivariate equation.

17. A method in a computer system for performing animated 3D visualization of one or more super multivariate equations, comprising:
    accepting user supplied or preset or computer generated initial values for variables and viewing parameters to the super multivariate equation;
    rendering one or more surfaces representing the super multivariate equation(s);
    accepting one or more modified values for one or more higher order independent variables to one or more of the super multivariate equations;
    replacing one or more rendered surfaces with newly rendered surface(s) representing one or more super multivariate equations using the modified higher order independent variable value(s); and
    repeating the acceptance of modified value(s) and the replacing of the rendered surface(s) to produce interactive animation of the surface(s) representing the super multivariate equation(s).

18. The method of claim 16, further comprising a means to zoom, pan, and rotate the rendered surface(s).

19. method of claim 16, further comprising one or more visible markers which may be interactively moved to selected positions on the rendered surface(s) using user interface elements or computer generated values, and the value of the dependent variable(s) of the super multivariate equation(s) at the selected position(s) is displayed.

20. The method of claim 16, wherein the super multivariate equation(s) calculate the value of portfolio(s) of financial derivatives.

* * * * *